United States Patent
Schmidt et al.

[11] 3,878,209
[45] Apr. 15, 1975

[54] 0-6(7)-METHOXY-QUINOXALINYL(2)-(THIONO)PHOSPHORIC (PHOSPHONIC) ACID ESTERS AND ESTER AMIDES

[75] Inventors: Karl-Julius Schmidt, Wuppertal-Vohwinkel; Ingeborg Hammann, Cologne; Bernhard Homeyer, Opladen, all of Germany

[73] Assignee: Bayer Aktiengesellschaft, Leverkusen, Germany

[22] Filed: Aug. 28, 1972

[21] Appl. No.: 284,324

[30] Foreign Application Priority Data
Sept. 4, 1971  Germany............................ 2144391

[52] U.S. Cl................. 260/250 QP; 71/92; 424/250
[51] Int. Cl............................................... C07d 51/78
[58] Field of Search.................................. 260/250 Q

[56] References Cited
UNITED STATES PATENTS

| | | | |
|---|---|---|---|
| 3,029,237 | 4/1962 | Sasse.................................... | 260/250 |
| 3,505,327 | 4/1970 | Miller et al. ..................... | 260/250 R |
| 3,621,021 | 11/1971 | Miller............................... | 260/250 R |
| 3,678,050 | 7/1972 | Gagnaux.......................... | 260/250 R |

FOREIGN PATENTS OR APPLICATIONS

| | | | |
|---|---|---|---|
| 928,494 | 6/1963 | United Kingdom............. | 260/250 R |
| 1,081,249 | 8/1967 | United Kingdom............. | 260/250 R |
| 702,672 | 8/1967 | Belgium.............................. | 260/250 |

*Primary Examiner*—Donald G. Daus
*Assistant Examiner*—Ralph D. McCloud
*Attorney, Agent, or Firm*—Burgess, Dinklage & Sprung

[57] ABSTRACT

0-6(7)-methoxy-quinoxalinyl(2)-(thiono)phosphoric(-phosphonic) acid esters and ester amides of the formula:

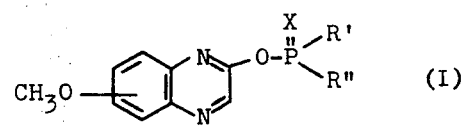

in which
R' is alkoxy with up to 10 carbon atoms or dilower alkylamino,
R'' is alkyl or alkoxy with up to 6 carbon atoms, phenyl or di-lower alkylamino,
the CH$_3$O radical is in the 6- or 7-position, and X is oxygen or sulfur,
which possess insecticidal, acaricidal and fungicidal properties.

7 Claims, No Drawings

0-6(7)-METHYOXY-QUINOXALINYL(2)-(THIONO)PHOSPHORIC (PHOSPHONIC) ACID ESTERS AND ESTER AMIDES

The present invention relates to and has for its objects the provision of particular new 0-6(7)-methoxy-quinoxalinyl(2)-(thiono)phosphoric(phosphonic) acid esters and ester amides, which possess insecticidal, acaricidal and fungicidal properties, active compositions in the form of mixtures of such compounds with solid and liquid dispersible carrier vehicles, and methods for producing such compounds and for using such compounds in a new way especially for combating pests, e.g. insects, acarids and fungi, with other and further objects becoming apparent from a study of the within specification and accompanying examples.

It has been disclosed in Belgian Patent Specification No. 702,672 that alkyl-substituted and nitro-substituted quinoxalyl(thiono)phosphoric(phosphonic) acid esters, such as 0,0-diethyl-0-(6-nitro- (Compound A) or 5,7-dimethyl-quinoxalyl(2))-thionophosphoric acid ester (Compound B) and 0-ethyl-0-(5- or 6-methylquinoxalyl(2))-ethanethionophosphonic acid ester (Compound C), display insecticidal and acaricidal properties.

The present invention provides, as new compounds the quinoxalyl-(thiono)phosphoric(phosphonic) acid esters and ester amides of the formula

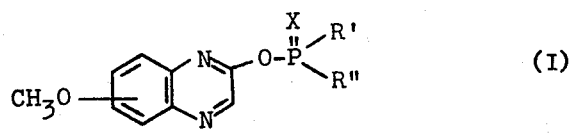

in which
R' is alkoxy with up to 10 carbon atoms or di-lower alkylamino,
R'' is alkyl or alkoxy with up to 6 carbon atoms, phenyl or di-lower alkylamino,
the $CH_3O$ radical is in the 6- or 7-position, and
X is oxygen or sulfur.

R' is preferably straight-chain or branched alkoxy with 1 to 8 carbon atoms, dimethylamino or diethylamino; and R'' is preferably phenyl, dimethylamino, diethylamino or a straight-chain or branched lower alkyl or alkoxy radical with 1 to 4 carbon atoms.

cides. This demand results from the fact that commercially available agents have to meet increasingly demanding requirements with regard to matters of protection of the environment, which can go as far as to lead to the prohibition of certain agents. Such requirements are, for example, low toxicity to warm-blooded animals, low phytotoxicity, rapid degradation in and on the plant in order to allow short waiting periods, and activity against resistant pests. The compounds according to the invention thus represent a genuine enrichment of the art.

The present invention also provides a process for the preparation of a methoxy-substituted quinoxalyl-(thiono)phosphoric(phosphonic) acid ester or ester amide of the formula (I), in which a 2-hydroxyquinoxaline derivative of the formula:

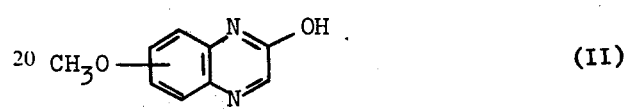

in which
the $CH_3O$ radical is in the 6- or 7-position, is reacted in the form of an alkali metal salt, an alkaline earth metal salt or an ammonium salt thereof or in the presence of an acid-binding agent, with a (thiono)phosphoric(phosphonic) acid ester halide, ester amide halide or amide halide of the formula:

in which
R', R'' and X have the above-mentioned meanings, and
Hal is halogen, preferably chlorine.

If 2-hydroxy-6- or -7-methoxyquinoxaline and 0,0-diethylphosphoric acid ester chloride are used as the starting materials, the course of the reaction can be represented by the following equation:

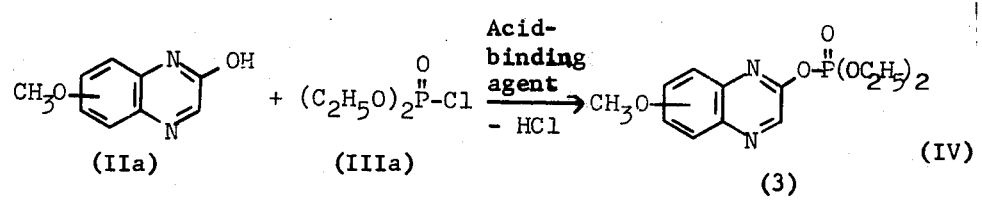

Surprisingly, the methoxy-substituted quinoxalyl-(thiono)phosphoric(phosphonic) acid esters and ester amides according to the invention display, in addition to a fungicidal action, a higher insecticidal, especially soil-insecticidal, and acaricidal action than do previously known compounds. The compounds according to the invention also contribute to satisfying the constant demand for new active compounds in the field of pesti- The 2-hydroxy-6- or -7-methoxyquinoxaline of the formula (II) required as the starting material can be prepared as follows: 5-methoxy-o-phenylenediamine is either reacted with glyoxyl ester semi-acetal or treated with chloroacetic acid in the presence of a base and subsequently oxidized. A mixture of the isomers 2-hydroxy-6-methoxy-quinoxaline and 2-hydroxy-7-quinoxaline is thus obtained:

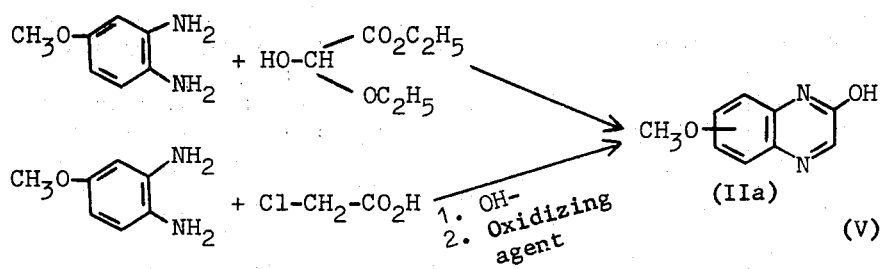

The following may be mentioned as examples of the (thiono)phosphoric(phosphonic) acid ester halides, ester amide halides and amide halides of the formula (III):

N,N,N',N'-tetramethyl- and N,N,N',N'-tetraethyl-phosphoric acid diamide halides and the corresponding thiono analogues:

N,N-dimethyl-O-methyl-, N,N-dimethyl-O-ethyl-, N,N-dimethyl-O-n-propyl, N,N-dimethyl-O-isopropyl-, N,N-dimethyl-O-n-butyl-, N,N-dimethyl-O-sec.-butyl-, N,N-dimethyl-O-tert.-butyl, N,N-di-methyl-O-isobutyl-, N,N-dimethyl-O-(3-ethylhexyl)-, and N,N-di-methyl-O-hexyl-phosphoric acid ester amide halides and the corresponding thiono analogues;

O,O-dimethyl-, O,O-diethyl-, O,O-di-n-propyl-, O,O-di-isopropyl-, O,O-di-n-butyl-, O,O-di-sec.-butyl-, O,O-di-tert.-butyl- and O,O-di-isobutyl-phosphoric acid ester halides and the corresponding thiono analogues; and O-methyl-, O-ethyl-, O-n-propyl-, O-isopropyl-, O-n-butyl-, O-isobutyl-, O-tert.-butyl-, O-sec.-butyl-, O-pentyl-, O-2-methylbutyl-, O-hexyl-, O-2-methylpentyl(4)-, O-2-ethylbutyl(1)-, O-2,2-dimethylbutyl(1)-, O-octyl-, O-2-ethylhexyl-, and O-2,2-dimethylhexyl-benzene-, -methane-, -ethane-, -propane- and -butane-phosphonic acid ester halides and the corresponding thiono analogues.

The preparative process is preferably carried out with the use of a suitable solvent or diluent. Practically all inert organic solvents can be used, especially aliphatic and aromatic optionally chlorinated hydrocarbons, such as benzene, toluene, xylene, benzine, methylene chloride, chloroform, carbon tetrachloride and chlorobenzene; ethers, such as diethyl ether, dibutyl ether and dioxane; ketones, for example acetone, methyl ethyl ketone, methyl isopropyl ketone and methyl isobutyl ketone; and nitriles, such as acetonitrile and propionitrile.

Any customary acid-acceptor can be used as the acid-binding agent. Alkali metal carbonates and alcoholates, such as sodium carbonate, potassium carbonate, sodium methylate and ethylate and potassium methylate and ethylate, have proved particularly suitable, as have aliphatic, aromatic and heterocyclic amines, for example triethylamine, dimethylamine, dimethylaniline, dimethylbenzylamine and pyridine.

The reaction temperature can be varied over a fairly wide range. In general, the reaction is carried out at about 0° to 120°C, preferably at about 20° to 75°C.

In general, the reaction is carried out at normal pressure.

To carry out the process, the starting substances are generally reacted in equimolar amounts, in a suitable solvent, at the indicated temperatures and in the presence of an acid-binding agent. After continuing to stir for one or more hours, the reaction mixture is worked up in the usual manner by taking it up in an organic solvent, for example benzene, eluting soluble constituents with water and sodium hydroxide solution and drying and concentrating the benzene phase.

The compounds obtained in a crystalline form are generally characterized by their melting points.

The compounds obtained in the form of colorless to slightly colored oils can in most cases be purified by distillation; those that decompose easily can be freed of the last volatile constituents, and thus purified, by so-called "slight distillation," that is to say by prolonged heating to moderately elevated temperatures under reduced pressure. The oils are generally characterized by their refractive indexes.

As has already been mentioned, the new quinoxalyl-(thiono)phosphoric(phosphonic) acid esters and ester amides are distinguished by an excellent insecticidal, especially soilinsecticidal, and acaricidal activity towards plant pests, pests harmful to health and pests of stored products. They possess a good action against both sucking and biting insects and against mites (Acarina). At the same time they display a low phytotoxicity and a number of them also display fungicidal activity.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis tomyzus korschelti*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-black moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuh-*

*niella*) and greater wax moth (*Galleria mellonella*); and the like.

Also to be classed with the biting insects contemplated herein are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*) the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius = Tetranychus althaeae* or *Tetranychus urticae*) and the European red mite (*Paratetranychus pilosus = Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellents which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide esters of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and fungicides, or bactericides, rodenticides, nematocides, herbicides fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and fungi, and more particularly methods of combating at least one of insects and acarids, which comprises applying to at least one of correspondingly (a) such insects, (b) such acarids, (c) such fungi, and (d) the corresponding habitat thereof, i.e., the locus to be protected, a correspondingly combative or toxic amount, i.e., an insecticidally, acaricidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Plutella test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-black moth (*Plutella maculipennis*).

After the specified periods of time, the degree of destruction is determined as a percentage: 100% means that all the caterpillars are killed whereas 0% means that none of the catepillars are killed.

The active compounds, the concentrations of the active compounds, the evaluation time and the results can be seen from the following Table 1:

Table 1

(insects that damage plants)

Plutella test

| Active Compounds | Active compound concentration in % by weight | Degree of destruction in % after 3 days |
| --- | --- | --- |
| 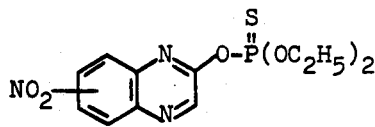 (known) (A) | 0.1<br>0.01 | 100<br>30 |
| 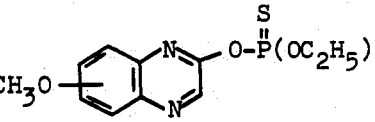 (1) | 0.1<br>0.01<br>0.001 | 100<br>100<br>30 |
| 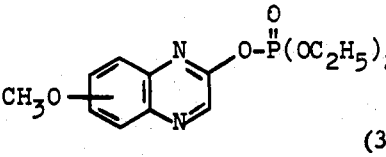 (3) | 0.1<br>0.01<br>0.001 | 100<br>100<br>50 |

Table 1 (continued)

(insects that damage plants)

Plutella test

| Active Compounds | Active compound concentration in % by weight | Degree of destruction in % after 3 days |
|---|---|---|
| 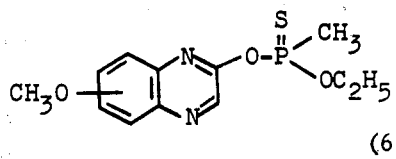 (6) | 0.1<br>0.01<br>0.001 | 100<br>100<br>100 |
| 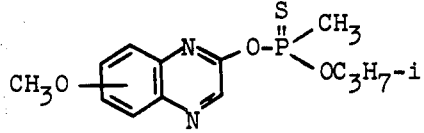 (7) | 0.1<br>0.01<br>0.001 | 100<br>100<br>95 |
| 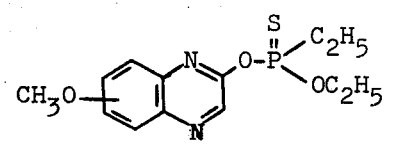 (8) | 0.1<br>0.01<br>0.001 | 100<br>100<br>90 |
| 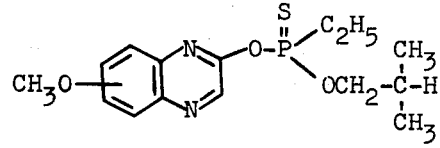 (10) | 0.1<br>0.01<br>0.001 | 100<br>100<br>30 |
| 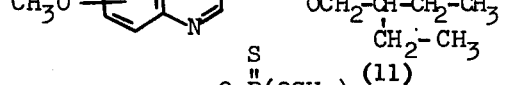 (11) | 0.1<br>0.01<br>0.001 | 100<br>80<br>30 |
| 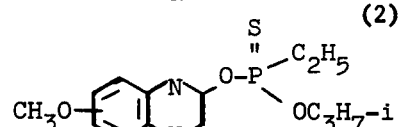 (2) | 0.1<br>0.01<br>0.001 | 100<br>95<br>50 |
| 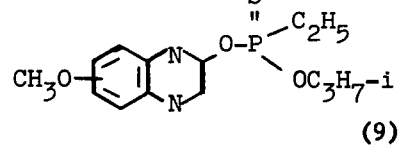 (9) | 0.1<br>0.01<br>0.001 | 100<br>100<br>60 |

EXAMPLE 2

Myzus test (contact action)

Solvent: 3 parts by weight acetone

Emulsifier: 1 part by weight alkylarylpolyglycol ether

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 2:

Table 2
(insects harmful to plants)
Myzus test
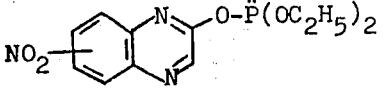
| Active compounds | Active compound concentration in % by weight | Degree of destruction in % after 1 day |
|---|---|---|
| (A) (known) | 0.1 / 0.01 | 98 / 40 |
| (1) | 0.1 / 0.01 | 100 / 100 |
| (3) | 0.1 / 0.01 / 0.001 | 100 / 100 / 50 |
| (6) | 0.1 / 0.01 / 0.001 | 100 / 100 / 98 |
| (7) | 0.1 / 0.01 / 0.001 / 0.0001 | 100 / 100 / 100 / 50 |
| (8) | 0.1 / 0.01 / 0.001 / 0.0001 | 100 / 100 / 99 / 80 |
| (10) | 0.1 / 0.01 / 0.001 / 0.0001 | 100 / 100 / 75 / 30 |
| (14) | 0.1 / 0.01 | 100 / 98 |
| (9) | 0.1 / 0.01 / 0.001 / 0.0001 | 100 / 100 / 100 / 98 |

EXAMPLE 3

Tetranychus test/resistant

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with the two-spotted spider mite (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3:

EXAMPLE 4

Critical concentration test/soil insects

Test insects: *Phorbia brassicae*/grubs in the soil

Solvent: 3 parts by weight acetone

Emulsifier: 1 part by weight alkylarylpolyglycol ether

To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m (for example mg/l), is decisive. The soil is filled into pots and the pots are left to stand at room temperature. After 24 hours, the test insects are put into the treated soil and, after a further 48 hours, the degree of effectiveness of the active compound is determined as a percentage by counting the dead and living test insects. The degree of effectiveness is 100% if all test insects have been killed; it is 0% when exactly as many test insects are still alive as in the case of the control.

The active compounds, the amounts applied and the results can be seen from the following Table 4:

Table 3

(mites harmful to plants)

Tetranychus test (resistant)

| Active compounds | Active compound concentration in % by weight | Degree of destruction in % after 2 days |
|---|---|---|
| (B) 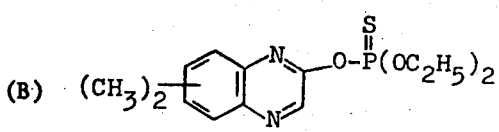 (known) | 0.1 | 0 |
| (C) 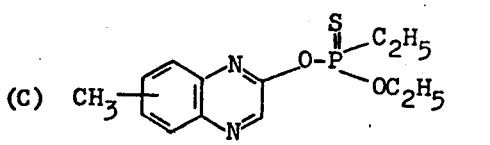 (known) | 0.1 | 20 |
| (6) 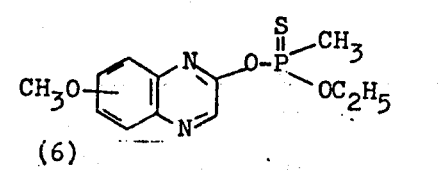 | 0.1 | 99 |

Table 4

(soil insects)

Phorbia brassicae - grubs in the soil

| Active compound | Degree of destruction in % at an active-compound concentration (in ppm) of | | | |
|---|---|---|---|---|
| | 20 | 10 | 5 | 2.5 |

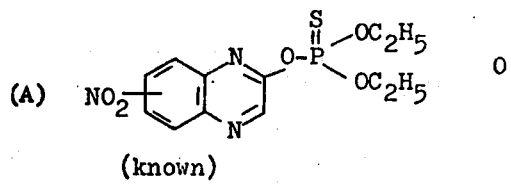

(A) (known)

0

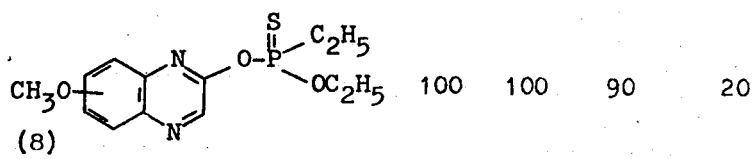

(B) 100 100 90 20

The process of the invention is illustrated by the following preparative Examples.

EXAMPLE 5

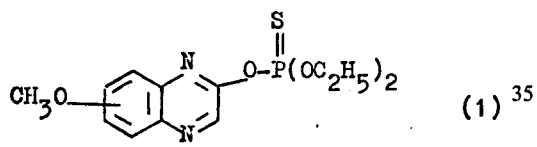
(1)

44 g (0.25 mole) of 2-hydroxy-6(7)-methoxyquinoxaline and 40 g of potassium carbonate are boiled in 300 ml of acetonitrile for 30 minutes. 47 g (0.25 mole) of 0,0-diethylthiophosphoryl chloride are added dropwise to the reaction mixture at 70°C and the whole is stirred for a further 4 hours under reflux. The mixture is cooled and taken up in 300 ml of benzene and the soluble constituents are eluted with water, then with 1 N NaOH and again with water; the benzene solution is dried over sodium sulfate and evaporated in vacuo. The residue that crystallizes is dissolved in alcohol and the solution is cooled. After standing for some time, white crystals separate out, which are isolated and dried in air. 64 g (78% of theory) of 0,0-diethyl-0-6(7)-methoxyquinoxalinyl(2)-thionophosphoric acid ester of the melting point 60°–61°C are obtained.

EXAMPLE 6

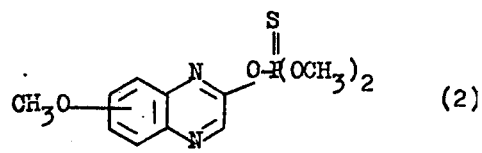
(2)

52 g (0.3 mole) of 2-hydroxy-6(7)-methoxyquinoxaline and 45 g of potassium carbonate are boiled in 300 ml of acetonitrile for 30 minutes. The reaction mixture is cooled to room temperature and 48 g (0.3 mole) of 0,0-dimethylthiophosphoryl chloride are added dropwise. While doing so, the temperature is kept at 20°C. The reaction mixture is further stirred overnight, additionally warmed to 35°–40°C for 1 hour and worked up as in Example 1. 38 g (42% of theory) of 0,0-dimethyl-0-6(7)-methoxyquinoxalinyl(2)-thionophosphoric acid ester of the melting point 64°C are obtained.

The following compounds can be prepared by methods analogous to those described above:

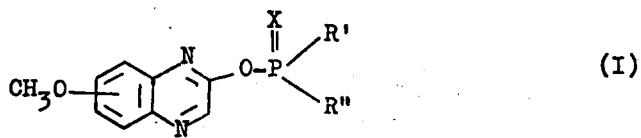
(I)

| Compound No. | X | R" | R' | Yield % | Physical data (melting point, refractive index) |
|---|---|---|---|---|---|
| 3 | 0 | OC$_2$H$_5$ | OC$_2$H$_5$ | 42 | m.p. 49°C |
| 4 | 0 | OC$_3$H$_7$i | OC$_3$H$_7$i | 53 | m.p. 68°C |

— Continued

| Compound No. | X | R" | R' | Yield % | Physical data (melting point, refractive index) |
|---|---|---|---|---|---|
| 5 | S | $OC_3H_7i$ | $OC_3H_7i$ | 66 | m.p. 58°C |
| 6 | S | $CH_3$ | $OC_2H_5$ | 45 | m.p. 60°C |
| 7 | S | $CH_3$ | $OC_3H_7i$ | 48 | m.p. 70°C |
| 8 | S | $C_2H_5$ | $OC_2H_5$ | 65 | m.p. 62°C |
| 9 | S | $C_2H_5$ | $OC_3H_7i$ | 44 | m.p. 51°C |
| 10 | S | $C_2H_5$ | $OCH_2CH(CH_3)_2$ | 74 | $n_D^{24}$ 1.5658 |
| 11 | S | $C_2H_5$ | $OCH_2CH(C_2H_5)_2$ | 78 | $n_D^{24}$ 1.5505 |
| 12 | S | $C_2H_5$ | $OCH_2CH-C_2H_5$ $\mid$ $C_4H_9$ | 84 | $n_D^{24}$ 1.5465 |
| 13 | S | $C_6H_5$ (phenyl) | $OC_2H_5$ | 75 | m.p. 69°C |
| 14 | O | $OC_2H_5$ | $N(CH_3)_2$ | 40 | $n_D^{24}$ 1.5582 |
| 15 | O | $N(CH_3)_2$ | $N(CH_3)_2$ | 35 | m.p. 93°C |

It will be appreciated that the instant specification and examples are set forth by way of illustration and not limitation, and that various modifications and changes may be made without departing from the spirit and scope of the present invention.

What is claimed is:

1. An 0-6(7)-methoxy-quinoxalyl(thiono)phosphoric(phosphonic) acid ester of the formula

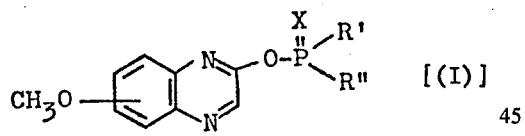

in which
R' is alkoxy with up to 10 carbon atoms,
R" is alkyl or alkoxy with up to 6 carbon atoms,
the CH₃O radical is in the 6- or 7- position, and
X is oxygen or sulfur.

2. A compound according to claim 1, in which R' is straight-chain or branched alkoxy having 1 to 8 carbon atoms, and R" is straight-chain or branched lower alkyl of 1 to 4 carbon atoms or alkoxy having 1 to 4 carbon atoms.

3. A compound according to claim 1, wherein such compound is 0,0-diethyl-0-6(7)-methoxy-quinoxalinyl(2)-phosphoric acid ester of the formula

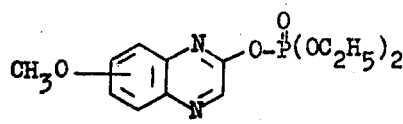

4. A compound according to claim 1, wherein such compound is 0-ethyl-0-6(7)-methoxy-quinoxalinyl(2)-methanethionophosphonic acid ester of the formula

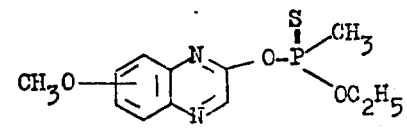

5. A compound according to claim 1, wherein such compound is 0-isopropyl-0-6(7)-methoxy-quinoxalinyl(2)-methanethionophosphonic acid ester of the formula

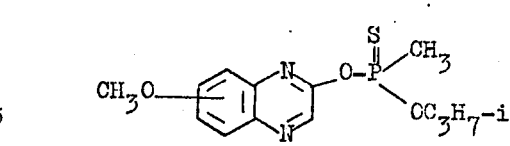

6. A compound according to claim 1, wherein such compound is 0-ethyl-0-6(7)-methoxy-quinoxalinyl(2)-ethanethionophosphonic acid ester of the formula

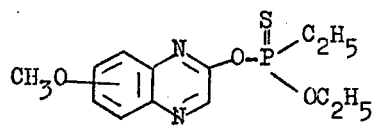

7. A compound according to claim 1, wherein such compound is 0-isopropyl-0-6(7)-methoxy-quinoxalinyl(2)-ethanethionophosphonic acid ester of the formula

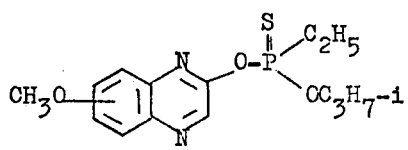

* * * * *